United States Patent Office 3,435,097
Patented Mar. 25, 1969

3,435,097
PHENOLIC-SULFIDE-PHOSPHITE
COMPOUNDS
James Bottomley, Tewksbury, and Richard Strauss, Lexington, Mass., assignors to National Polychemicals, Inc., Wilmington, Mass., a corporation of Massachusetts
No Drawing. Filed Mar. 26, 1965, Ser. No. 443,174
Int. Cl. C08f 45/58; C08c 13/08
U.S. Cl. 260—887
10 Claims

ABSTRACT OF THE DISCLOSURE

Polymer compositions are stabilized to elevated temperatures by the addition of a phenolic-sulfide-phosphite polymer which is prepared either by (1) the esterification of a phenol sulfide with a trivalent inorganic phosphorus compound or (2) by the sulfurization of an aromatic phosphite.

---

Our invention relates to novel phenolic-sulfide-phosphite polymers, their method of preparation, and their utility as stabilizers. More particularly, our invention concerns the use of phenolic sulfide-phosphite polymers as stabilizers in polymers such as polypropylene and styrene-butadiene rubber.

Our phenolic-sulfide-phosphite polymers include the phosphite esters of phenolic-sulfide polymers (ester polymers) and the reaction polymers prepared by the reaction of aryl phosphites with sulfur halides like sulfur mono- and sulfur dichloride (reaction polymers). Ester polymers are prepared by esterfying a phenol sulfide with phosphorous trichloride. The phenolic sulfides may be substituted or unsubstituted mono-, di- or polyphenolic sulfides, such as phenol sulfide; thiobisphenols; having one or more sulfur atoms between the two phenolic rings; or polyphenol sulfides. Thiobisalkyl substituted phenols are such as 4,4'-thiobis(2,6-ditertiary butyl phenol) and 4,4'-thiobis(nonylphenol) and the like particularly useful in the preparation of stabilizers.

Representative structures for substituted phenolic sulfide include:

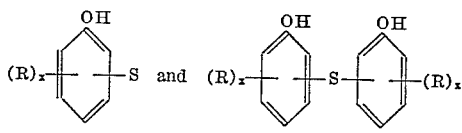

and

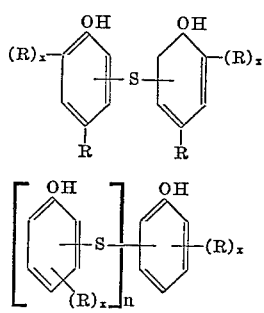

and the like wherein R represents one or more hydrocarbon radicals such as alkyl, alkylene, cycloalkyl, aryl and mixed alkylaryl radicals, $x$ is a number from 0 to 4, and $n$ is a number from 0 to 6 or more. Para-substituted or 2,6-substituted $C_1$-$C_{12}$ alkyl radicals such as tertiarybutyl, nonyl, octyl, cyclohexyl, dibutyl, etc. have been found to be useful in preparing good stabilizers for polypropylene.

Phenol sulfides are prepared in a well known manner by the reaction of one mol of the phenolic compound with from 1 to 2 mols or more of a sulfur compound such as sulfur monochloride and sulfur dichloride at temperatures of 80 to 350° F. with the removal of HCl is the sulfurization reaction proceeds. Typical mono- and diphenol sulfides include di(6-tertiarybutyl-m-cresol) sulfide, nonylphenyl sulfide, phenol sulfide, di-(p-nonylphenol) sulfide, di(octylphenol) sulfide, di(ditertiarybutylphenol) sulfide, di(amyl naphthol) sulfide, mono-, di- and poly(2,6-ditertiary-4-methylphenol) sulfide and the like.

The phenol sulfides are reacted with a trivalent inorganic acid phosphorous compound like $PCl_3$ to esterify all or some of the hydroxy groups of the phenol sulfides. Products having desirable stabilizing properties in polypropylene are produced by reacting a stoichiometric quantity of about 0.33 mols of $PCl_3$ to each mol of phenol. Antioxidant properties may also be obtained in hindered phenolic sulfides where free hydroxy groups are provided, accordingly from 0.05 to 0.33 mols of $PCl_3$ per mol of phenol may be used to prepare phenolic sulfide phosphites. The reaction is preferably carried out in a non-aqueous solvent such as aromatic hydrocarbon solvent like benzene, toluene, xylene and the like. After addition of the $PCl_3$, the temperature is raised to drive off the resulting HCl, and an alkaline neutralizer such as sodium carbonate may then be added and the sulfide-phosphite product recovered from the reaction mixture.

The reaction polymers of our invention are prepared by sulfurizing an aromatic phosphite, such as by reacting an aryl, or substituted aryl phosphite with sulfur or a sulfur compound like a sulfur halide such as sulfur monochloride and sulfur dichloride. Typical organic aryl phosphites comprise aryl phosphites like triphenyl phosphite, alkyl substituted aryl phosphites like diphenyl phosphite, tricresyl phosphite, tritertiary butylphenyl phosphite, tri(2,6-tertionyl butyl-4-methylphenyl) phosphite; alkylenebisalkylphenyl phosphites like methylene(bis-4,6-tertiarybutylphenyl) phosphite; mixed alkylaryl and cycloalkylaryl phosphites like (dioctylphenyl) (2-ethylhexyl) phosphite, (phenyl)(dicyclohexyl) phosphite, (methyl)(di-nonylphenyl) phosphite, (dinonyl) (nonylphenyl) phosphite, (didodecyl)(oxtylphenyl) phosphite and the like and combinations thereof. The aryl phosphite may be fully esterified or when antioxidant properties are desired in the reaction polymers such as with hindered phenyl phosphites free hydroxy group may be provided on the phosphite materials.

The aryl phosphites are reacted usually in a suitable non-aqueous solvent such as a hydrocarbon particularly an aromatic solvent like benzene, toluene, etc. or a halogenated solvent with $S_2Cl_2$ or $SCl_2$ to produce our reaction polymers. In a typical reaction from about 0.1 to 2.0 mols of $S_2Cl_2$ or $SCl_2$ are reacted with each mol or aryl phosphite depending upon the degree of sulfurization desired. The resulting products are mono-, di,- tri and polysulfurized phosphite reaction polymers. The reaction is commonly carried out at temperatures of 80 to 300° F. sufficient to remove the resulting HCl. These polymers have somewhat different inherent properties than our phosphte esters. When a greater degree of sulfurization is desired the reaction with sulfur chlorides may be carried out in the presence of free sulfur.

The mol rates of the sulfur chlorides to phenol may vary in typical preparations from 0.25 to 1.0 to 5.0 to 1 with the total sulfur varying from about 4.4% to 7.65%, e.g. 4.4 to 16.0 wt. percent. The weight percent phosphorous may vary from about 0.25 wt. percent to about 9.5 wt. percent, e.g. 3.5 to 6.0 wt. percent.

With both our ester polymers and reaction polymers it is desirable to remove any excess free phenol compounds from the materials such as by steam stripping prior to employing these products as stabilizers in polypropylene. These materials may also be wholly or partially neutralized by the use of alkali and alkaline earth hydroxides and oxides as well as the basic compounds and salts like carbonates, ammonia, ethylene oxide, calcium oxide, sodium hydroxide, magnesium hydroxide, sodium and potassium carbonate, zinc oxide, amines, and the like.

Our materials usually range from viscous liquids to brittle solids and from pale yellow to yellow-orange in color depending upon the materials and the processing conditions.

Representative examples and methods of preparing our phenolic-phosphite-sulfide polymers are as follows:

EXAMPLE 1

Nonylphenol (220 g.) (1 mol) is charged in a one liter flask equipped with thermometer, water condenser and stirrer. Benzene (100 ml.) is added to flask. Sulfur monochloride (45 g.) (0.33 mol) is added dropwise at room temperature. Hydrogen chloride fumes are produced with approximately a 10° C. exotherm. A nitrogen sparge is added to the system and the temperature is raised to 90° C. to drive off HCl. The resulting produce is a sulfur-linked dimer of nonylphenol and free nonylphenol. The temperature is dropped to 60° C. and phosphorous trichloride (46 g.) (0.33 mol) is added dropwise. A 7 to 8° C. endotherm is produced. The temperature is raised to 90° C. for one hour, then the condenser is removed and temperature is raised to 120° C. for two hours. Sodium carbonate (3 grams) is added and the mixture stirred for one hour. The product is then filtered hot (100–110° C.). The product is a yellow-orange viscous liquid with a viscosity above 100,000 cps., an $n_d$ of 1.5545, a specific gravity of 1.05–1.10; and contains 4.09% by weight of phosphorous (theoretical 4.11%).

EXAMPLE 2

Sulfur monochloride ($S_2Cl_2$) (90 grams) (0.66 mol) is added in the same procedure as Example 1. The product is light brown brittle solid containing 3.51% by weight of phosphorous (theoretical 3.80%).

EXAMPLE 3

Nonylphenol (220 grams) (1 mol) in 60 ml. of benzene is charged into a 1 liter vessel, and sulfur dichloride ($SCl_2$) (34 grams) (0.33 mol) is added dropwise at room temperature. A 15° C. exotherm and HCl fumes are produced. The temperature is raised to 90° C. to drive off HCl and any unreacted $SCl_2$. The mixture is then cooled to 60° C., and $PCl_3$ (46 grams) (0.33 mol) is added dropwise. The temperature is raised over a one-hour period to 90° C., then held for one hour before raising it to 120° C. for one hour. The product is an orange-brown semi-solid containing 3.97% by weight of phosphorous (theoretical 4.30%).

EXAMPLE 4

Phenol (125 grams) (1.33 mols) in 100 ml. of benzene is charged into a flask and sulfur monochloride (57.6 grams) (0.43 mol) is added dropwise. An 18° C. exotherm is produced. $PCl_3$ (50 grams) (0.36 mol) is added at 55° C. and a 19° C. endotherm is produced. The temperature is raised to 120° C. to drive off HCl and benzene. The product is poured out, which product on cooling is a hard brittle dark brown solid.

EXAMPLE 5

Nonylphenol (220 grams) is heated to 60° C. and $PCl_3$ (45.8 grams) (0.33 mol) is added dropwise. The temperature is raised to 90° C. for one hour and then to 150° C. for four hours to drive off all HCl. Sulfur monochloride (45 grams) (0.33 mol) is added dropwise, at 75° C. to the trinonylphenol phosphite thus produced. The temperature is raised to 90° C., then to 140° C. for two hours. The reaction is then complete and the product recovered is a very viscous brown liquid containing 4.08% by weight of phosphorous (theoretical 4.11%).

EXAMPLE 6

Example 1 is repeated employing tertiary butyl phenol, sulfur monochloride and phosphorous trichloride to give a pale yellow solid having a M.P. 95–100° C. and a phosphorous content of 5.74% by weight.

Our phosphite sulfide polymers aid in preventing a change in properties during processing of the polymer, plastic, elastomer, or resin into which they are incorporated. Our sulfide phosphite polymers also aid in protecting the finished or processed material from further degradation on exposure to heat or in storage. Our phosphite polymers may be used along or in combination with and as a component of other and conventional stabilizer systems. Our phosphite polymers may be used in a wide variety of plastics requiring stabilizing additives such as vinyl resins like polyvinyl chloride and vinylchloride-vinyl acetate copolymers, polyesters, urethanes, acrylic resins, styrene resins like polystyrene and rubber-modified polystyrenes, and in other polymers particularly those thermoplastic light colored polymers which normally develop color on storage or during processing at elevated temperatures. Our phosphite polymers may be employed as the phosphite chelator in barium-cadmium and barium-zinc and other stabilizing systems for vinyl resins.

Our sulfide-phosphite polymers may also be employed with natural and synthetic elastomers such as those homo and copolymeric diene conjugate elastomers requiring a stabilizer additive. Such elastomers would include but not be limited to: rubbery styrene-butadiene copolymers (SBR); as well as polymers of butadiene and acrylonitrile such as acrylonitrile-butadiene copolymers; acrylonitrile-butadiene-styrene copolymers; (ABS), polybutadiene; butyl rubber; and acrylonitrile-styrene copolymers. Other elastomers include natural rubber, carboxylated elastomers, ethylene-propylene rubbery copolymers and terpolymers with dienes like cyclopentadiene and the like.

Our sulfide-phosphite polymers find significant utility as stabilizer additives in natural and synthetic hydrocarbon resins such as $C_2$–$C_4$ polyolefin resins like polypropylene, polyethylene, ethylene-propylene copolymers, polybutene, etc.

Polypropylene and propylene copolymers are inherently more prone to oxidation than polyethylene resins, and usually require a higher processing temperature than polyethylene resins. Organic phosphites such as trisnonylphenyl phosphites are conventionally employed in polypropylene, however previous organic phosphites have not proved satisfactory in preventing color development during processing or in storage. Our phosphite-sulfide polymers protect the color properties and the physical properties significantly better than trisnonyl phenyl phosphite, the conventional organic phosphite now used in polyethylene and polypropylene, without some of the disadvantages.

Our sulfide-phosphite polymers may be used alone or in combination with other additives such as stabilizers and anti-oxidants such as organic phosphites like trisnonylphenyl phosphite, alkylated phenols like butylated-hydroxy cresol and toluene, aromatic amines, borates, alkylene bisalkylated phenols like methylene bis-2, 6-paratertiarybutyl cresol, thiobisalkylated phenols, and BB′ thiopropionic acid esters like dilauryl and distearyl thiodipropionate and the like. Our polymers may also be advantageously employed with and as a substitute for the organic phosphite in the stabilizer compositions disclosed in our copending application, Ser. No. 306,339, filed Sept. 10, 1963, now U.S. Patent No. 3,244,662 issued Apr. 5, 1966. Our phosphite polymer may be added or dispersed directly in bulk into the material, to be stabilized or added to solutions or emulsions of the material. Typically our phosphite polymers are added in amounts of from about 0.1 to 5 percent by weight e.g. 0.5 to 2.0 weight percent to the material to be protected.

Representative examples of the unique stabilizing ability of our phosphite polymers particularly in comparison with the widely used conventional trisnonylphenyl phosphite are as follows:

EXAMPLE 7

The phosphite polymer of Example 1 was tested as a stabilizer by incorporation into a styrene-butadiene rubber (SBR) emulsion at 1.25 percent parts of the product per 100 parts of the elastomer. A similar amount of trisnonylphenyl phosphite was added to another portion of the SBR latex. After 8 hours at 78° C. each SBR sample was examined for the degree of hydrolysis of the additive. The test sample with our sulfide-phosphite polymer showed essentially no hydrolysis, while the trisnonylphenyl phosphite sample showed 8 to 10% hydrolysis. The precipitated SBR polymerizate was then heat aged in an oven at 70° C. for 96 hours. The SBR-phosphite polymer sample produced essentially zero percent gel, and a color at least equal to a comparison sample similarly treated containing the standard commercial stabilizer, trisnonylphenyl phosphite.

EXAMPLE 8

The stabilizing effect of our phosphite polymers in representative polypropylene resins during processing was determined by mixing the polypropylene resin samples with and without stabilizing additives in a Brabender Plastigraph at 200° C. for 30 minutes and then pressing the samples into squares 2″ x 2″ x 1/16″. The samples were then compared for color development and strength. Typical results are shown in Table 1, employing a polypropylene resin Profax 6513 (a product of the Hercules Powder Co.) having a melt index of about 2.8. This resin has an original translucent white color. Profax 6513 contains an antioxidant stabilizing system which includes about 0.25 weight percent butylated hydroxyl toluene, (2,6-ditertiarybutyl cresol) (BHT) and 0.25 weight percent of dilaurylthiodipropionate (DLTP). The hindered phenol and dipropionate are added to the resin during polymerization which produces a better stabilized product.

TABLE I.—EFFECT OF PHENOLIC-SULFIDE-PHOSPHITE POLYMERS AS STABILIZERS IN POLYPROPYLENE DURING PROCESSING

| Polypropylene Sample 6513 with— | Color After Processing |
|---|---|
| No additive | Tan color. |
| 0.5 wt. percent trisnonylphenyl phosphite | Pale tan. |
| 0.5 wt. percent disulfidephosphite polymer of Example 1. | Light tan. |
| 0.5 wt. percent paratertiary butyl phenyl disulfide phosphite of Example 6. | Do. |
| 0.5 wt. percent paratertiary butyl phenyl monosulfide phosphite (made as in Example 5 with SCl₂ and p-tertiary butyl phenol to produce a pale yellow brittle solid having a melting point of above 120° C.). | Translucent white. |

This data illustrates that our sulfide-phosphite polymers are more effective than trisnonylphenyl phosphite in inhibiting color development of stabilized polypropylene resin during processing.

EXAMPLE 9

A really effective stabilizer will not only inhibit a degradation of the polypropylene during processing, but will also reduce color development and strength diminution during storage or heat aging.

Stabilized Profax 6513 after processing at 200° C. for 15 minutes gradually develops a yellow color on storage. Trisnonylphenyl phosphite is ineffective in preventing this color development, while our phosphite stabilizers are remarkably more effective. Heat aging tests were conducted by preparing samples on the Brabender at 200° C. for 15 minutes and then pressing the samples into squares 2″ x 2″ x 1/16″. These squares are heat aged in an oven at 150° C. for seven days (168 hours) and then observed for color development and strength. Table II illustrates the results of typical tests of heat aging on both Profax 6513 and Profax 6501 an essentially unstabilized white polypropylene resin.

The above data illustrates that our phenolic-sulfide-phosphite polymer may be used in stabilizer systems to replace trisnonylphenyl phosphite and/or DLTP or as the entire stabilizing system at least as regards protecting the strength of polypropylene. Our polymers are definitely superior to the conventional prior art stabilizing systems as shown in tests 2 and 7. The paratertiary butyl phenyl disulfide phosphite polymer prepared as in Example 6 appeared to exhibit the best stabilizing properties, since it could be substituted as a phosphite alone, or for phosphite and DLTP, or for the total stabilizer system.

TABLE II.—EFFECT OF PHENOLIC-PHOSPHITE-SULFIDE POLYMERS AS STABILIZERS IN POLYPROYLENE ON STORAGE

| Sample | After heat aging 150° C. for 168 hours | |
|---|---|---|
| | Color | Strength |
| 1. 6513-no additive | Dark brown (after 96 hrs.). | Crumbles when picked up. |
| 2. 6513-0.5 wt. percent trisnonyl phenyl phosphite. | Dark yellow to brown (after 96 hrs.). | Crumbles along the edges when picked up. |
| 3. 6513-0.5 wt. percent disulfide phosphite polymer of Example 1. | Pale yellow | Appears to have original strength. |
| 4. 6513-0.5 wt. percent paratertiary butyl phenyl disulfide phosphite polymer.[1] | Pale yellow (lighter than 3). | Do. |
| 5. 6513-0. 5 wt. percent paratertiary butyl phenyl monosulfide phosphite polymer.[1] | Light brown | Do. |
| 6. 6501-no additive | Dark brown (after 48 hrs.). | Crumbles when picked up. |
| 7. 6501-0.5 wt. percent trisnonyl phenyl phosphite, 0.25 wt. percent DLTP, 0.25 wt. percent BHT. | Dark brown (after 72-96 hours). | Do. |
| 8. 6501-0.5 wt. percent polymer of Example 1, 0.25 wt. percent DLTP, 0.25 wt. percent BHT. | Light brown | Appears to have original strength. |
| 9. 6501-0.75 wt. percent polymer of Example 1, 0.25 wt. percent BHT. | do | Do. |
| 10. 6501-0.75 wt. percent tertiary butyl phenyl disulfide phosphite polymer,[1] 0.25 wt. percent BHT. | Medium brown | Do. |
| 11. 6501-1.0 wt. percent tertiary butyl phenyl disulfide phosphite polymer.[1] | Dark brown | Do. |

[1] Polymer of Example 6.

This polymer with 0.1 to 0.50 free OH group may be an excellent antioxidant-stabilizer for plastics and elastomers.

Our monosulfide and disulfide phosphite ester polymers are often effective replacements for the dilauryl thiopropionate in polypropylene stabilizer systems. The monosulfide polymers appear to impart better stability during short term processing, but the disulfide polymers appear to be more effective in long term stabilizing at 150° C. Several sulfide phosphite polymers having free OH groups have been tested as antioxidants, and have been found to have performed better in comparative tests than the corresponding non-OH group sulfide-phosphite polymers.

As illustrated our sulfide-phosphite polymers remarkably enhance the stabilization of polypropylene resin in comparison to resin without additives or with a conventional organic phosphite additive.

What we claim is:

1. A polymer composition subject to degradation at elevated temperatures to which has been added a stabilizing amount of a stabilizer consisting essentially of a phenolic-sulfide-phosphite polymer selected from the group consisting of the product of the esterification of a phenol sulfide with a trivalent inorganic phosphorus compound and the product of the sulfurization of an aromatic phosphite with sulfur monochloride or sulfur dichloride;

said polymer selected from the group consisting of elastomers, polyethylene and polypropylene; said phenolic-sulfide-phosphite polymer showing substantially no hydrolysis or gel formation and substantially no change in the color properties of said polymers when employed with said polymers.

2. The composition as defined in claim 1 wherein the polymer is an elastomeric diene conjugate polymerizate.

3. The composition as defined in claim 2 wherein said polymerizate is a styrene-butadiene copolymer.

4. The composition as defined in claim 1 wherein the phenolic-sulfide-phosphite polymer is prepared by reacting an aryl phosphite with sulfur dichloride.

5. The product defined in claim 4 wherein said aryl phosphite is trisnonylphenyl phosphite.

6. The product as defined in claim 1 wherein said phenol sulfide is prepared by the reaction of nonyl phenol and sulfur monochloride and said phosphorus compound is phosphorus trichloride.

7. The product as defined in claim 1 which includes a thio-dipropionate.

8. The composition as defined in claim 7 wherein said thio-dipropionate is dilauryl-thio-dipropionate.

9. The product as defined in claim 1 which includes a hindered phenol.

10. The product as defined in claim 9 wherein said hindered phenol is butylated hydroxy toluene.

References Cited

UNITED STATES PATENTS

| | | | |
|---|---|---|---|
| 3,356,770 | 12/1967 | Larrison | 260—45.95 |
| 3,376,364 | 4/1968 | Larrison | 260—45.95 |
| 2,362,624 | 11/1944 | Gaynor et al. | 260—985 |
| 3,012,004 | 12/1961 | Baker | 260—45.7 |
| 3,354,117 | 11/1967 | Schmidt et al. | 260—45.85 |
| 3,167,526 | 1/1965 | Nicholson | 260—45.7 |
| 3,244,661 | 4/1966 | Kline | 260—45.7 |
| 3,255,136 | 6/1966 | Hecker et al. | 260—23 |
| 3,297,631 | 1/1967 | Brown et al. | 260—45.95 |
| 3,112,286 | 11/1963 | Morris et al. | 260—45.95 |

FOREIGN PATENTS 257,517   3/1962   Australia.

OTHER REFERENCES

Kosoladoff: Organophosphorus Compounds (1950), pp. 235–236.

DONALD E. GZAJA, *Primary Examiner.*

HOSEA E. TAYLOR, JR., *Assistant Examiner.*

U.S. Cl. X.R.

260—45.7, 45.85, 45.95, 897, 985